US008960658B2

(12) United States Patent
Vasis et al.

(10) Patent No.: US 8,960,658 B2
(45) Date of Patent: Feb. 24, 2015

(54) PLATFORM ATTACHMENT FOR A ROTARY HAND TOOL

(75) Inventors: Thomas C. Vasis, Niles, IL (US); Daniel J. Williams, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 521 days.

(21) Appl. No.: 12/893,150

(22) Filed: Sep. 29, 2010

(65) Prior Publication Data

US 2012/0074635 A1 Mar. 29, 2012

(51) Int. Cl.
*B23Q 3/00* (2006.01)
*B25B 1/24* (2006.01)
*B23C 1/20* (2006.01)
*B25F 3/00* (2006.01)

(52) U.S. Cl.
CPC ........................................ *B25F 3/00* (2013.01)
USPC ............... 269/293; 269/291; 269/71; 269/60; 269/295; 269/309; 269/310; 409/180; 409/182; 409/179; 409/181

(58) Field of Classification Search
USPC ............. 269/293, 291, 71, 60, 295, 309–310; 409/180, 182, 179, 181
See application file for complete search history.

(56) References Cited

U.S. PATENT DOCUMENTS

| | | | | |
|---|---|---|---|---|
| 2,114,106 | A | 4/1938 | Geveke | |
| 2,906,067 | A | 9/1959 | Hale | |
| 3,596,411 | A | 8/1971 | Hutchins | |
| 4,156,990 | A | 6/1979 | Rutkowski | |
| 4,615,144 | A | 10/1986 | Peacock et al. | |
| 6,279,885 | B1 * | 8/2001 | Leon, Jr. | 269/8 |
| 6,752,572 | B2 * | 6/2004 | Talesky et al. | 409/179 |
| 7,029,212 | B2 * | 4/2006 | Adkins et al. | 409/180 |
| 2003/0044252 | A1 * | 3/2003 | Landt | 409/182 |
| 2004/0208719 | A1 * | 10/2004 | Adkins et al. | 409/182 |
| 2005/0002747 | A1 | 1/2005 | Adkins et al. | |
| 2005/0220554 | A1 | 10/2005 | Baber | |
| 2005/0220555 | A1 * | 10/2005 | Baber | 409/182 |
| 2007/0065246 | A1 * | 3/2007 | Baber et al. | 409/182 |

OTHER PUBLICATIONS http://www.dremel.com/en-us/Attachments/pages/ProductDetail.aspx?pid=A576.*
http://mdm.boschwebservices.com/files/r19316v3.pdf, Apr. 22, 2009.*
PCT International Search Report issued in corresponding PCT Application No. PCT/US2011/053966 on Mar. 12, 2012.

* cited by examiner

*Primary Examiner* — Lee D Wilson
*Assistant Examiner* — Nirvana Deonauth
(74) *Attorney, Agent, or Firm* — Maginot Moore & Beck LLP

(57) ABSTRACT

Embodiments of the present invention comprise a platform attachment for use with a power hand tool which has a housing with a front nose portion with a rotary output shaft extending therefrom, and a tool holding mechanism on the output shaft for holding a tool, the attachment comprising a mounting component having an opening generally aligned with the output shaft through which a tool can extend, a platform component having a base portion and a platform portion, the base portion being adjustably attached to the mounting component, the platform portion having an outer generally planar main surface that is perpendicular to the axis and having an opening through which a tool can extend, and a generally planar secondary surface that extends downwardly from the main surface at a predetermined angle relative to the axis, and a mechanism for releasably locking the platform component on the mounting component.

14 Claims, 7 Drawing Sheets

PLATFORM ATTACHMENT FOR A ROTARY HAND TOOL

BACKGROUND OF THE INVENTION

The present invention generally relates to attachments for power rotary hand tools.

Small rotary hand-held power tools have been marketed for many years for use in carrying out tasks relating to building and repairing objects, as well as general woodworking and metal working tasks by hobbyists as well as commercial artisans. Such small rotary hand tools generally have a motor unit with a rotary output shaft that extends from a nose portion of the tool housing. The nose portion is usually configured to enable various types of attachments to be mounted which act to either limit or guide the movement of a working tool implement that is being used in the power tool for grinding, carving, sawing, sanding and/or polishing. Such attachments often significantly improve the accuracy and effectiveness of working tool implements that are available for use in such rotary hand tools.

SUMMARY OF THE INVENTION

Embodiments of the present invention comprise a platform attachment for use with a power hand tool which has a housing with a front nose portion with a rotary output shaft extending therefrom, and a tool holding mechanism on the output shaft for holding a tool, the attachment comprising a mounting component configured to be removably attached to the hand tool, the mounting component having a central opening generally aligned with the output shaft through which a tool mounted in the tool holding mechanism can extend, a platform component adjustably attached to the mounting component, the platform component having a base portion and a platform portion, the base portion being adjustably attached to the mounting component, the platform portion having an outer generally planar main surface that is perpendicular to the axis and having an opening through which a tool can extend, and a generally planar secondary surface that extends downwardly from the main surface at a predetermined angle relative to the axis, both of the surfaces being configured to selectively provide support for objects that are being worked on by a tool, and a mechanism for releasably locking the platform component on the mounting component.

DETAILED DESCRIPTION

A preferred embodiment of the present invention comprises a platform attachment that is intended for use with small powered hand tools that artisans and hobbyists use to perform various tasks such as cutting and carve designs in wood and other materials, sanding and polishing work pieces, grinding metal for purposes of sharpening knifes, chisels or other tools. Moreover, such attachments may also be used with a spiral saw tool implement to cut openings in materials such as drywall or plywood, for example.

There are many different kinds of working tool implements that can be used with such power tools, including those that have a generally cylindrical shape with a center shaft for attachment to an output shaft of the tool, with the outer surface of the cylindrical tool implement having sandpaper, or other material applied for the purpose of performing the intended task. Since the cylindrical portion may have varying lengths in its axial direction, the attachment main support surface adjacent to the tool implement, which surface is preferably oriented perpendicular to the output shaft, is desirably adjustable so that the main support surface upon which a work piece or the like would rest would be at the proper elevation relative to the working implement itself.

The preferred embodiment of the present invention achieves this goal as well as provides a secondary support surface that is oriented at an angle relative to the main support surface.

Figure 1:
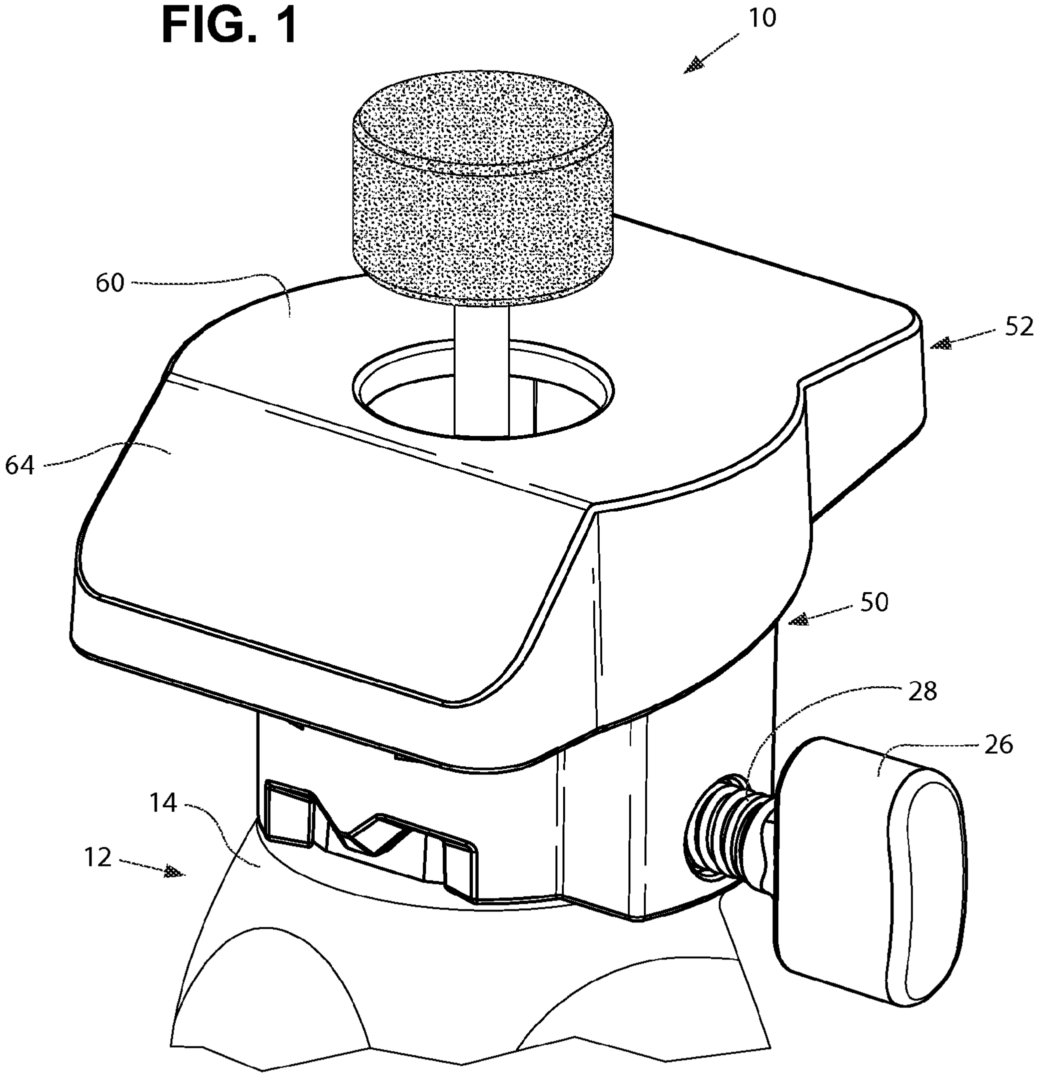
FIG. 1 is a perspective view of a preferred embodiment of the present invention shown together with a portion of a rotary hand tool in which a sanding tool bit is mounted.

Turning now to the drawings, and particularly FIG. 1, the preferred embodiment of the present invention is shown to be a platform attachment, indicated generally at 10, which is connected to a rotary power hand tool, indicated generally at 12, only a portion of which is shown in the drawing. More particularly, a nose portion 14 of the tool 12 is shown and it has a cylindrical threaded portion to which the platform attachment 10 is screwed onto. It should be understood that other attachment combinations can be used, and the design of the attachment 10 is dependent upon the configuration of the power hand tool nose portion.

Figure 2:
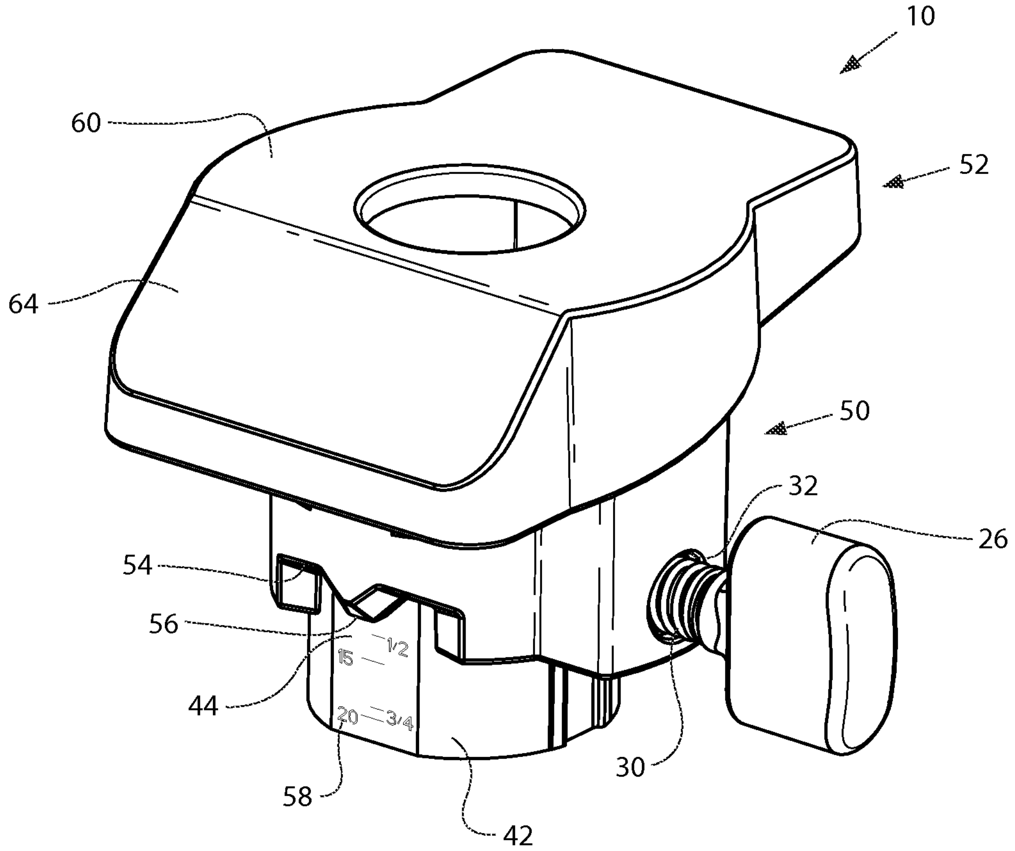
FIG. 2 is a front left elevated perspective view of the preferred embodiment shown in FIG. 1.
Figure 3:
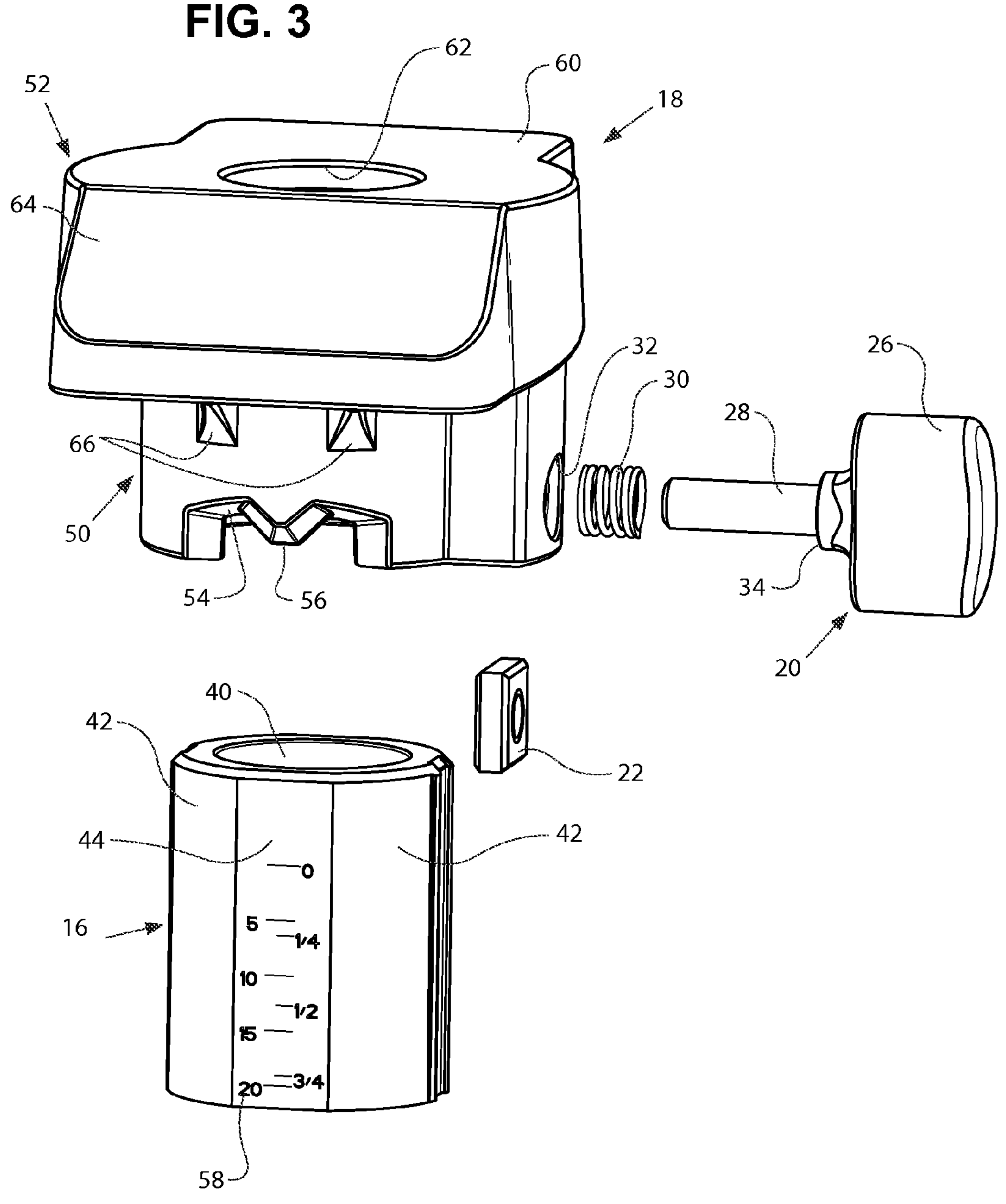
FIG. 3 is an exploded perspective view of the preferred embodiment shown in FIG. 1.

Referring to FIGS. 2 and 3, the platform attachment has a mounting component, indicated generally at 16, which has a cylindrical opening that is threaded with a thread that matches the threads on the hand tool nose portion 14 as indicated above. A platform component, indicated generally at 18, is configured to fit on the mounting component 16. A threaded screw head, indicated generally at 20, is provided to tighten the platform component 18 to the mounting component 16 at a desired position. In this regard, a nut 22 is sized to fit within a slot 24 in the platform component 18.

More particularly, the screw head 20 has an enlarged handle 26 that is preferably formed around a threaded bolt 28 that engages the nut 22 and a compression spring 30 is preferably provided to bear upon a slightly recessed flat surface 32 in the platform 18 as well as against an annular shoulder 34 located on the handle 26, with the spring 30 providing resistance to the screw head so that it will not easily loosen due to vibration caused by operation of the hand tool 12.

Figure 7:
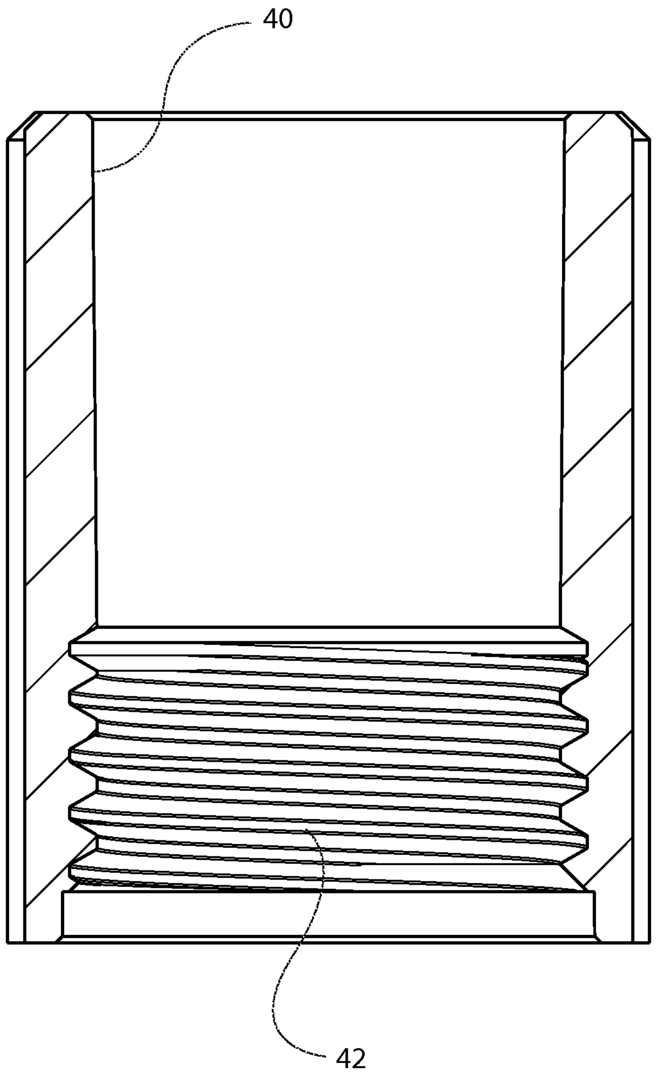
FIG. 7 is a cross section of a portion of the preferred embodiment shown in FIG. 1.

The mounting component 16 has a cylindrical opening 40, the lower portion of which is threaded at 42 as shown in FIG. 7, with the outer surface of the mounting component 16 also being generally cylindrical as shown at 42. The front and back portions of the mounting component 16 also have flat surfaces 44 and 46 which generally correspond to the inside configuration of a base portion 50 which is integrally formed with an upper platform portion, indicated generally at 52. The right and left sides of the mounting component 16 are provided with vertical slots, the right side slot of which is sized and configured to receive the end surface of the bolt 28 for holding the platform component 18 firmly to the mounting component 16.

Figure 4:
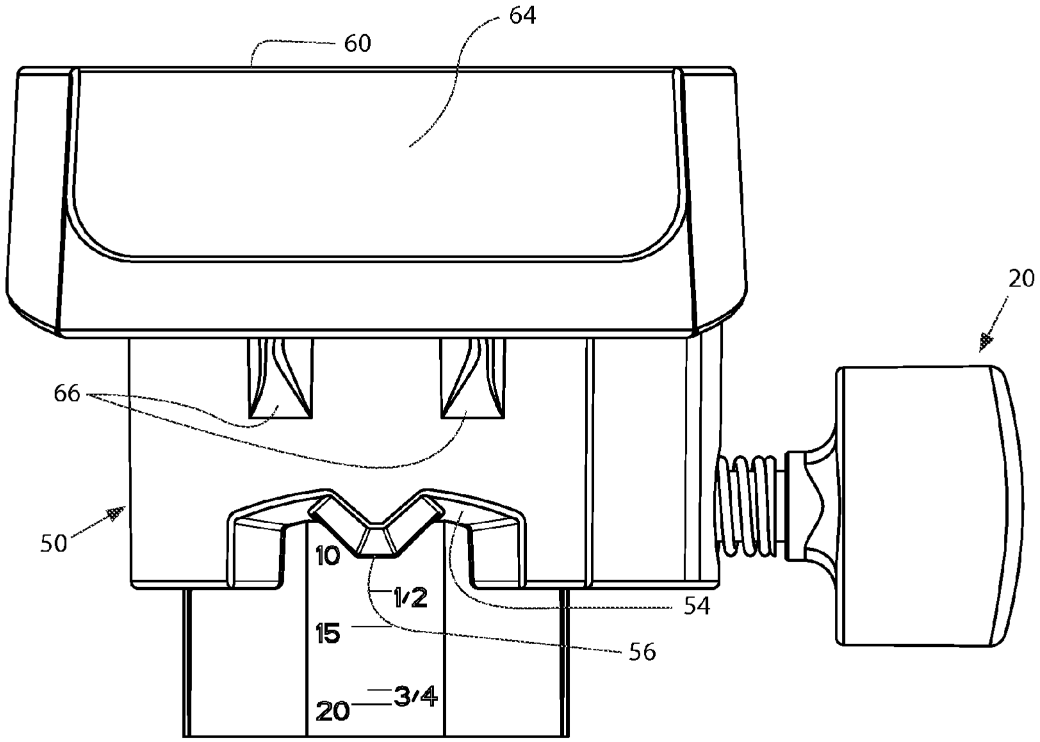
FIG. 4 is a front plan view of the preferred embodiment shown in FIG. 1.
Figure 5:
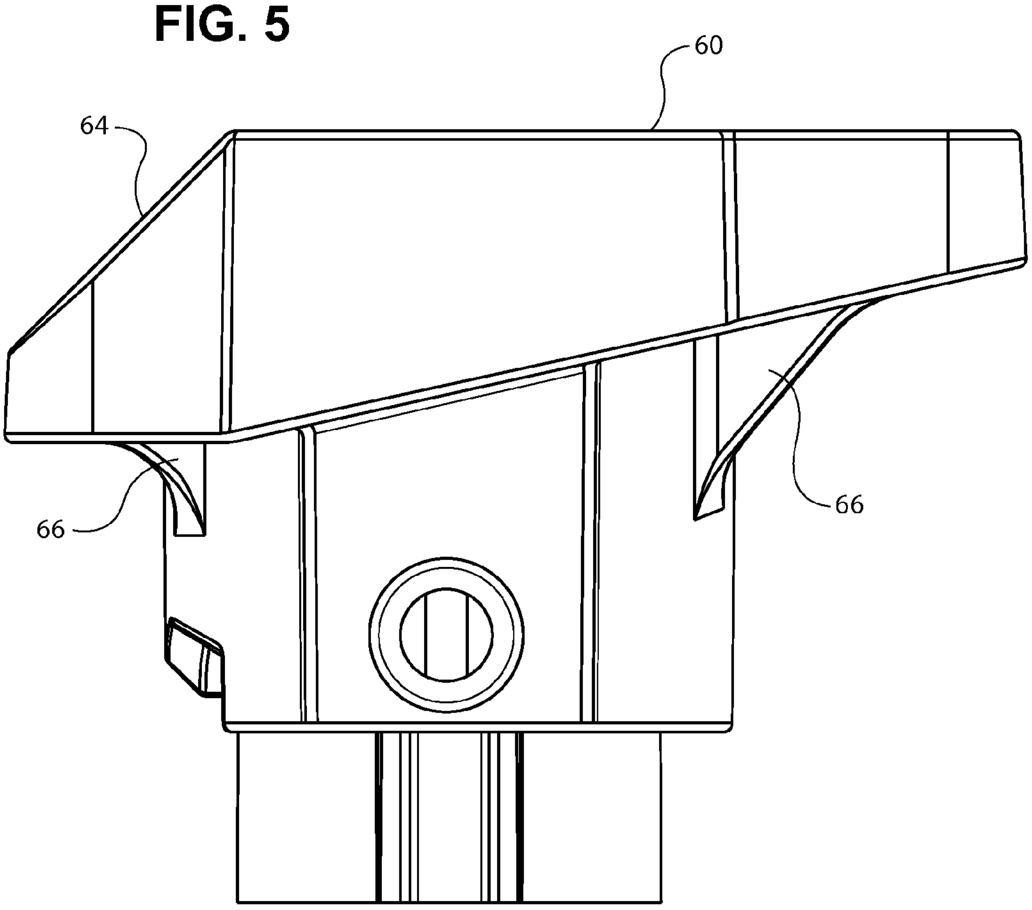
FIG. 5 is a right side view of the preferred embodiment shown in FIG. 1.
Figure 6:
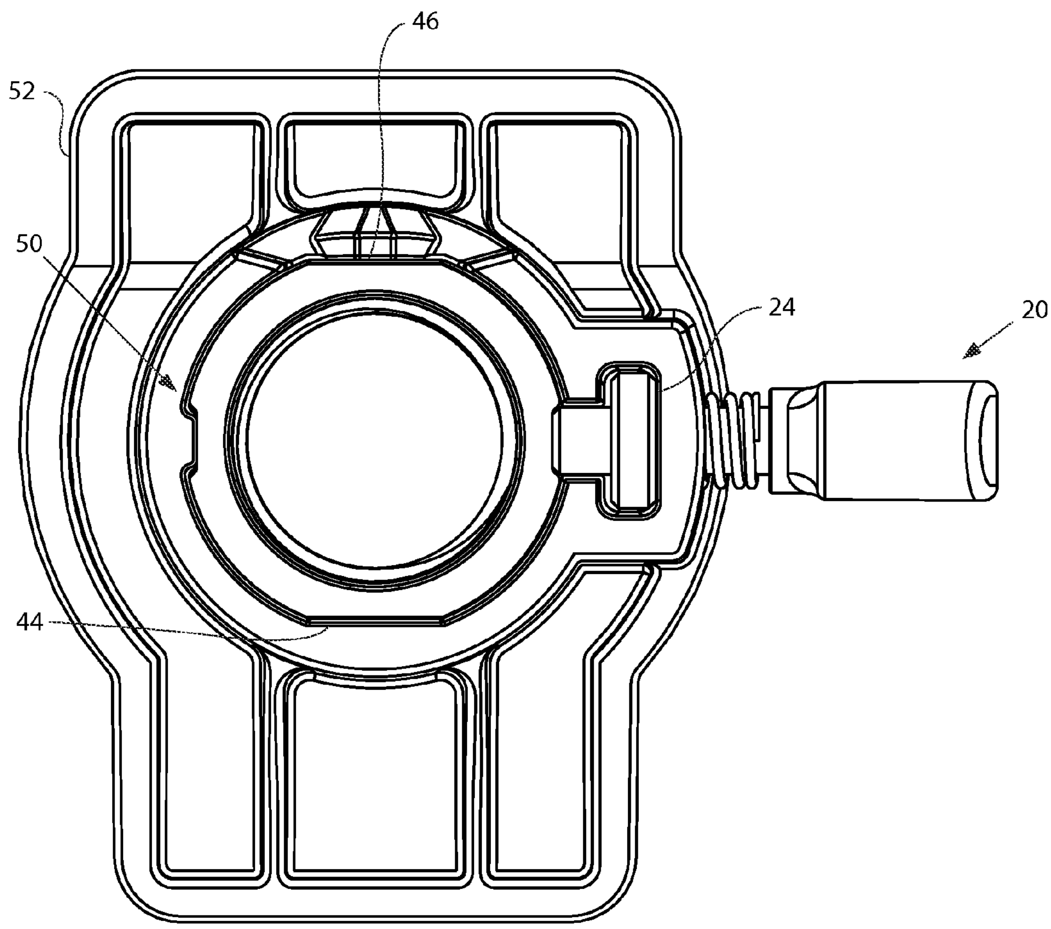
FIG. 6 is a bottom view of the preferred embodiment shown in FIG. 1.

As best shown in FIGS. 3 and 4, the base portion 50 has a cut out 54 formed in its front face, and it has a center extension 56 that functions as an indicator of the vertical position of the platform component relative to the mounting component 16 which has measurement indicia 58 as is shown in FIGS. 2-4.

The platform portion 52 is shown to be integrally formed with the base portion 50 and it has a flat main support surface 60 with a central opening 62 through which a tool implement can pass and the surface 60 interfaces with an angled secondary surface 64 which is preferably at an angle of about 45° to the surface 60, although the secondary surface may be formed at a different angle.

The platform attachment 10 is preferably made of a plastic or plastic-like material, with some metal components as has been described. The general thickness of the walls of the various components, including the platform portion 52 is approximately ⅛", so as to be strong, but relatively lightweight. Two support struts 66 are formed between the base portion 50 and the front as well as the back of the platform portion 52 which contribute to the overall strength of the platform component 18.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention.

Various features of the invention are set forth in the following claims.

What is claimed is:

1. A platform attachment for use with a power hand tool which has a housing with a front nose portion with a rotary output shaft extending therefrom, and a tool holding mechanism on the output shaft for holding a tool, said attachment comprising:

a mounting component configured to be removably attached to the hand tool, said mounting component having a central opening generally aligned with an axis of the output shaft through which a tool mounted in the tool holding mechanism can extend in a first direction;

a platform component adjustably attached to said mounting component, said platform component having a base portion and a platform portion, said base portion being adjustably attached to said mounting component, said platform portion being fixedly attached to said base portion and having (i) a leading generally planar main surface positioned farthest in the first direction that is perpendicular to said axis and that surrounds and defines an opening through which the tool can extend, and (ii) a generally planar secondary surface that extends from said main surface in a direction opposite said first direction at a predetermined angle relative to said axis, both of said main and said secondary surfaces being configured to selectively provide support for objects that are being worked on by the tool; and a mechanism for releasably locking said platform component on said mounting component, wherein said predetermined angle is within the range of about 35 degrees and 55 degrees.

2. The platform attachment as defined in claim 1 wherein said mounting component has a generally cylindrical shape with at least one flat outer surface portion extending throughout the length thereof.

3. The platform attachment as defined in claim 2 wherein said base portion has side walls defining an internal generally cylindrical opening with at least one flat surface segment extending substantially the length of said opening, said opening being configured to receive said mounting component, said flat surface segment being substantially coextensive with said flat outer surface portion of said base portion to thereby prevent said base portion from rotating on said mounting component.

4. The platform attachment as defined in claim 3 wherein said flat surface on said mounting component contains indicia representing one or more depth adjustment dimensions of said platform component relative to said mounting component.

5. The platform attachment as defined in claim 1 wherein the nose portion of the power tool is screw threaded and said mounting component has a screw threaded portion that is configured to engage the nose portion threads when said mounting component is screwed onto the nose portion.

6. The platform attachment as defined in claim 1 wherein said base portion has a side wall that has an aperture therein and an internal slot configured to receive and retain a screw threaded nut, said mechanism comprising a screw with a screw threaded cylinder to which a screw head is attached, said screw threaded cylinder extending through said aperture, said threaded nut and side wall so that an outer end can engage said mounting component and secure the same when a user rotates said screw head to tighten said screw.

7. The platform attachment as defined in claim 6 wherein said screw head is enlarged relative to said screw threaded cylinder and is molded to said cylinder.

8. The platform attachment as defined in claim 1 wherein said base portion and said platform portion are integrally molded of a plastic or plastic-like material.

9. The platform attachment as defined in claim 8 wherein said plastic or plastic-like material is glass filled nylon or acrylonitrile butadiene styrene (ABS).

10. The platform attachment as defined in claim 7 further comprising a compression spring positioned on said screw cylinder between said screw head and said outside wall of said base portion.

11. The platform attachment as defined in claim 1 wherein said predetermined angle is about 45 degrees.

12. A platform attachment for use with a power hand tool which has a housing with a front nose portion with a rotary output shaft extending therefrom, and a tool holding mechanism on the output shaft for holding a tool, said attachment comprising:

a mounting component configured to be removably attached to the hand tool, said mounting component having a central opening generally aligned with an axis of the output shaft through which a tool mounted in the tool holding mechanism can extend;

a platform component adjustably attached to said mounting component, said platform component having a base portion and a platform portion, said base portion being adjustably attached to said mounting component, said platform portion having an outer generally planar main surface that is perpendicular to said axis and having an opening through which a tool can extend, and a generally planar secondary surface that extends downwardly from said main surface at a predetermined angle relative to said axis, both of said surfaces being configured to selectively provide support for objects that are being worked on by the tool; and a mechanism for releasably locking said platform component on said mounting component, wherein said main surface has a generally truncated circular area concentric with said axis and an additional square rearward extension contiguous with said circular area, the truncated portion of said circular area being contiguous with said secondary surface.

13. The platform attachment as defined in claim 1 wherein the tool is one of a sanding cylinder, a grinding wheel or a grinding cylinder.

14. A platform attachment for use with a power hand tool which has a housing with a front nose portion having a rotary output shaft extending therefrom, and a tool holding mechanism attached to said output shaft, said attachment comprising:

a mounting component configured to be removably attached to the hand tool, said mounting component having a central opening generally aligned with said shaft axis through which a tool mounted in the tool holding mechanism can extend in a first direction;

a platform component having an integrally formed base portion and a platform portion, said base portion being slidably attached to said mounting component, said platform portion being fixedly attached to said base portion and having an outer flat main surface positioned farthest in said first direction that is perpendicular to the output shaft and that surrounds and defines an opening through which the tool can extend in said first direction, and a flat secondary surface that extends from said main surface at a predetermined angle relative thereto in a second direction that is opposite said first direction, both of said main and said secondary surfaces being configured to selectively provide support for objects that are being worked on by the tool; and a mechanism for locking said platform component on said mounting component at a predetermined position, wherein said predetermined angle is within the range of about 35 degrees and 55 degrees.

* * * * *